United States Patent [19]

Sandberg et al.

[11] Patent Number: 4,535,452

[45] Date of Patent: Aug. 13, 1985

[54] MULTI-MODEM VARIABLE PORT DEMULTIPLEXER SYNCHRONIZATION ADAPTER

[75] Inventors: Terrel W. Sandberg, Cedar City, Utah; Stanley Bottoms, Seminole, Fla.

[73] Assignee: Paradyne Corp., Largo, Fla.

[21] Appl. No.: 582,785

[22] Filed: Feb. 29, 1984

[51] Int. Cl.³ .............................................. H04J 3/06
[52] U.S. Cl. ...................................... 370/100; 375/107
[58] Field of Search .................... 370/100, 112, 84; 375/39, 42, 107, 120

[56] References Cited

U.S. PATENT DOCUMENTS

| | | | |
|---|---|---|---|
| 4,154,985 | 5/1979 | Munter | 370/84 |
| 4,160,128 | 7/1979 | Texier | 370/84 |
| 4,224,473 | 9/1980 | Kaul et al. | 370/84 |
| 4,229,623 | 10/1980 | Looschen | 370/84 |
| 4,322,844 | 3/1982 | Fellinger et al. | 370/84 |
| 4,432,087 | 2/1984 | Hubbard | 370/84 |
| 4,477,898 | 10/1984 | Cholat-Namy | 370/84 |

Primary Examiner—Douglas W. Olms
Assistant Examiner—Kenneth I. Rokoff
Attorney, Agent, or Firm—Kane, Dalsimer, Kane, Sullivan & Kurucz

[57] ABSTRACT

This invention discloses a demultiplexer with a first memory element for storing received data bits, a second memory element having individual cells connected to individual remote units (i.e. parallel output) and a logic unit for transferring the appropriate bits from the first to the second memory element in accordance with the received signal configuration. The enabling signal for the second memory element is derived from the demultiplex sync signal.

7 Claims, 4 Drawing Figures

MULTI-MODEM VARIABLE PORT DEMULTIPLEXER SYNCHRONIZATION ADAPTER

BACKGROUND OF THE INVENTION

1. Field of the Invention

This invention pertains to digital modems and more particularly to a demultiplexer adapter which can be used in modems of different bauds and/or data rates.

2. Description of the Prior Art

The development of high-speed data communications over voice-grade channels by using QAM or PSK-type modulation has led to the multiplexing of data from several DTE's. In such multiplexing schemes, the data demodulated at the receiving end must be separated by a demultiplexer into concurrent bit streams which correspond to the data originating from the several DTE's at the transmitting end. Different multiplexer and synchronizing schemes are used for modems operating at different bauds and/or data rates and therefore until now a separate demultiplexer had to be provided for each scheme.

OBJECTIVES AND SUMMARY OF THE INVENTION

An objective of the present invention is to provide a demultiplexer which separates the data at different data rates or bauds into individual bit streams.

Another objective is to provide a relatively simple demultiplexer which can be easily incorporated into existing modems.

According to this invention a demultiplexer adapter comprises a first memory element for received data bits, a second memory element with cells connected to several remote units and a logic unit which transfers the bits from the first to the second memory unit in accordance with the configuration of the received data. The transfer of the data bits from said second memory element is enabled by a synchronized signal derived from the received data signals.

DESCRIPTION OF THE PREFERRED EMBODIMENT

Figure 1:
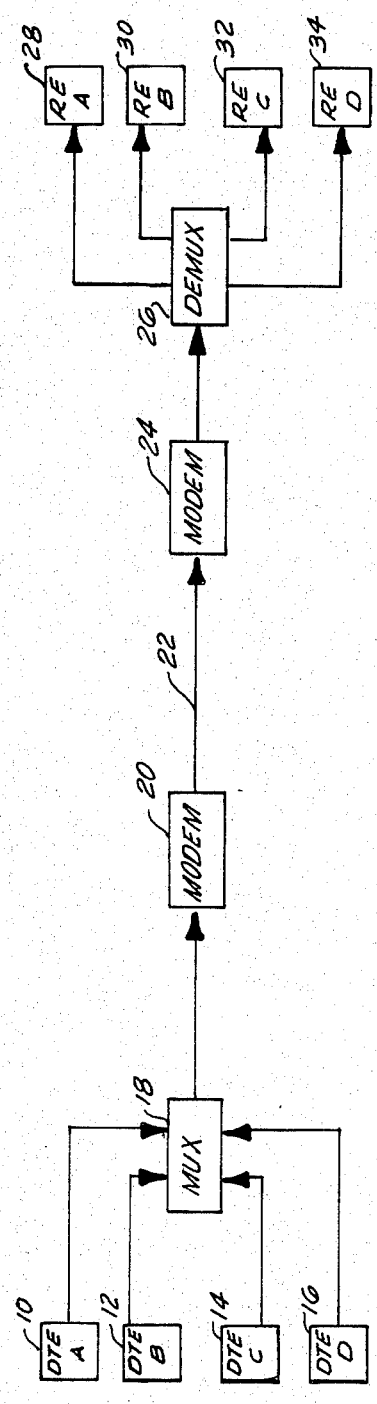
FIG. 1 shows a typical multiplexing data communication system.

A typical multiplexing scheme is shown in FIG. 1. Data from up to four (or more) DTE's 10, 12, 14, 16 are sent to a multiplexer 18 which combines the four individual bit streams bit-by-bit as described more fully below. The combined bit stream is sent by the multiplexer to a modem 20. The modem generates multi-valued signals by using well known encoding techniques such as QAM or PSK, each signal corresponding to n bits from said combined data stream. The signals are sent over a voice-grade communication channel 22 to a remote modem 24.

Remote modem 24 decodes the signals into a corresponding stream of binary bits which are sent to demultiplexer 26. The demultiplexer then separates the single bit stream into a plurality of streams which are sent through appropriate ports to corresponding remote equipment (RE) 28, 30, 32 and 34. In order to insure that the data from a particular DTE, for example DTE A indicated by numeral 10 ends up at remote equipment A (numeral 28), synchronizing signals are also provided for the multiplexing as described below. For the purposes of this discussion the multiplexer 18 and demultiplexer 26 are shown as being separate from modems 20 and 24 respectively. However it is to be understood that such devices are usually provided as subassemblies of the modems.

Figures 2, 3:
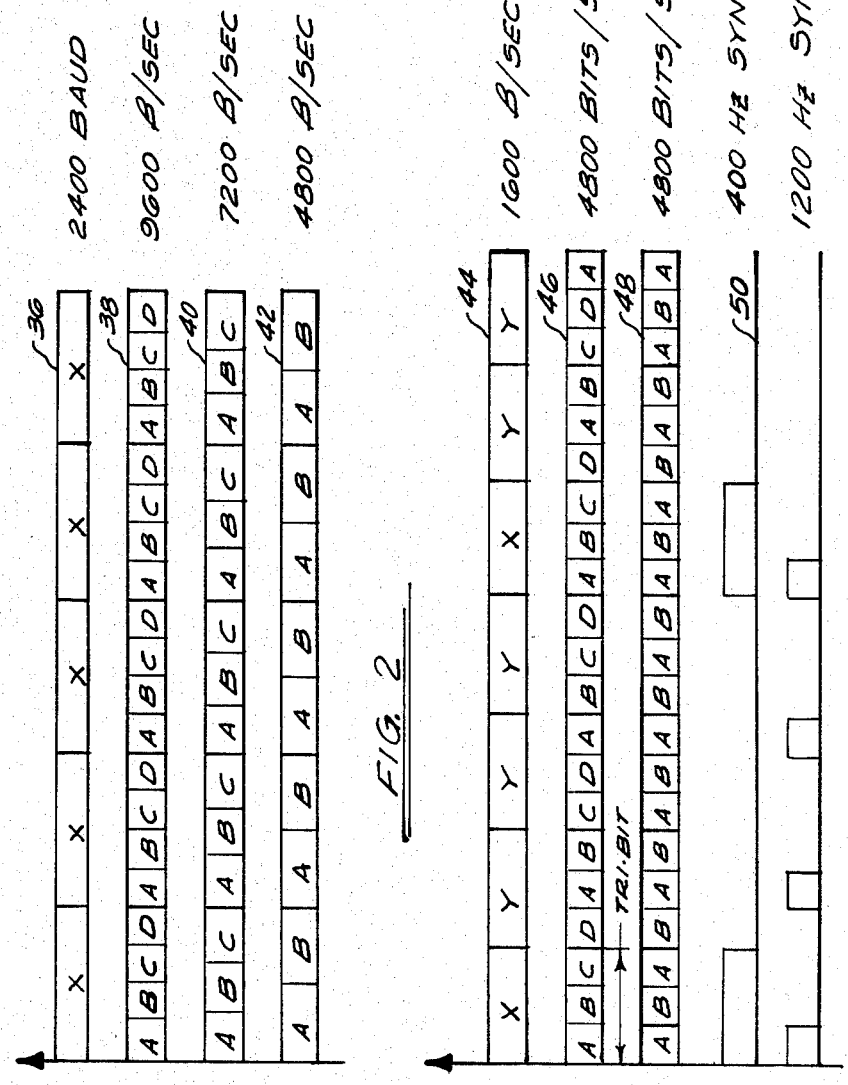
FIG. 2 shows a method of multiplexing two to four bit streams 2400 baud signals which can be demultiplexed by the present invention.
FIG. 3 shows a method of multiplexing two or three bit streams 1600 baud signals which can be demultiplexed by the present invention.

In FIG. 2, a stream or series of received 2400 baud signals 36 is shown comprising signals X. Modem 24 demodulates these signals into binary bits. Depending on whether modems 20 and 24 operate at 9600 b/sec, 7200 b/sec or 4800 b/sec, each signal is demodulated into 4, 3 or 2 bits respectively as shown. Thus each frame of 4-bits of series 38 corresponding to a particular signal X comprises one bit from each of the DTE's in a particular order, i.e. A, B, C, and D. Similarly the frames for series 40 and 42 comprise bits A, B, C and A, B respectively. Of course several other combinations of operating the modems shown in FIG. 1 are also possible. Several of these combinations are listed in TABLE 1, by way of example. These are selected from CCITT Spec. V.29.

TABLE 1

| Combination No. | Data Rate (Bits/sec) | Port A | Port B (Bits/second) | Port C | Port D |
|---|---|---|---|---|---|
| | | | (2400 baud system) | | |
| 1 | 9600 | 9600 | — | — | — |
| 2 | 9600 | 7200 | 2400 | — | — |
| 3 | 9600 | 4800 | 4800 | — | — |
| 4 | 9600 | 4800 | 2400 | 2400 | — |
| 5 | 9600 | 2400 | 2400 | 2400 | 2400 |
| 6 | 7200 | 7200 | — | — | — |
| 7 | 7200 | 4800 | 2400 | — | — |
| 8 | 7200 | 2400 | 2400 | 2400 | — |
| 9 | 4800 | 4800 | — | — | — |
| 10 | 4800 | 2400 | 2400 | — | — |

Series 38, 40 and 42 of FIG. 2 correspond to combinations 5, 8 and 10 respectively.

The configuration shown in FIG. 1 may also be used with a 1600 baud, 4800 b/s system. As shown in FIG. 3, the multiplexer 18 combines the data from DTE's 10, 12, 14, 16 into a single bit stream of the form ABCDA . . . each letter A, B, C and D corresponding to a bit from respective DTE A, B, C or D. These bits are encoded three at a time to generate corresponding QAM or PSK signals at 1600 baud which are transmitted to modem 24. In addition to the scheme shown in FIG. 3, other combinations are also available for a 1,600 baud system. Several of these combinations are listed in TABLE 2 by way of example.

TABLE 2

| Combination No. | Data Rate (bits/sec) | Port A | Port B (bits/sec) | Port C | Port D |
|---|---|---|---|---|---|
| | | | (1,600 baud) | | |
| 1 | 4800 | 4800 | — | — | — |
| 2 | 4800 | 2400 | 2400 | — | — |
| 3 | 4800 | 2400 | 1200 | 1200 | — |
| 4 | 4800 | 1200 | 1200 | 1200 | 1200 |
| 5 | 2400 | 2400 | — | — | — |

TABLE 2-continued

| | (1,600 baud) | | | | |
|---|---|---|---|---|---|
| Combination No. | Data Rate (bits/sec) | Port A | Port B | Port C (bits/sec) | Port D |
| 6 | 2400 | 1200 | 1200 | — | — |

In FIG. 2, bit streams 46 and 48 correspond to combinations 4 and 2 respectively.

It should be noted that each symbol X of the 2400 baud system comprises bits from the same DTE in the same order regardless of the particular bit rate used. For example, as shown in FIG. 2, at 9600 b/s, each symbol X corresponds to four bits, ABCD. At 7,200 b/s each symbol corresonds to three bits ABC and so on. However this is not always the case for the 1600 baud system. As shown in FIG. 3, at 4800 b/s, the first symbol corresponds to three bits ABC, the second symbol corresponds to bits DAB, the third symbol corresponds to bits CDA and so on. The pattern repeats after every fourth symbol. This factor must be taken into consideration during demultiplexing.

Figure 4:
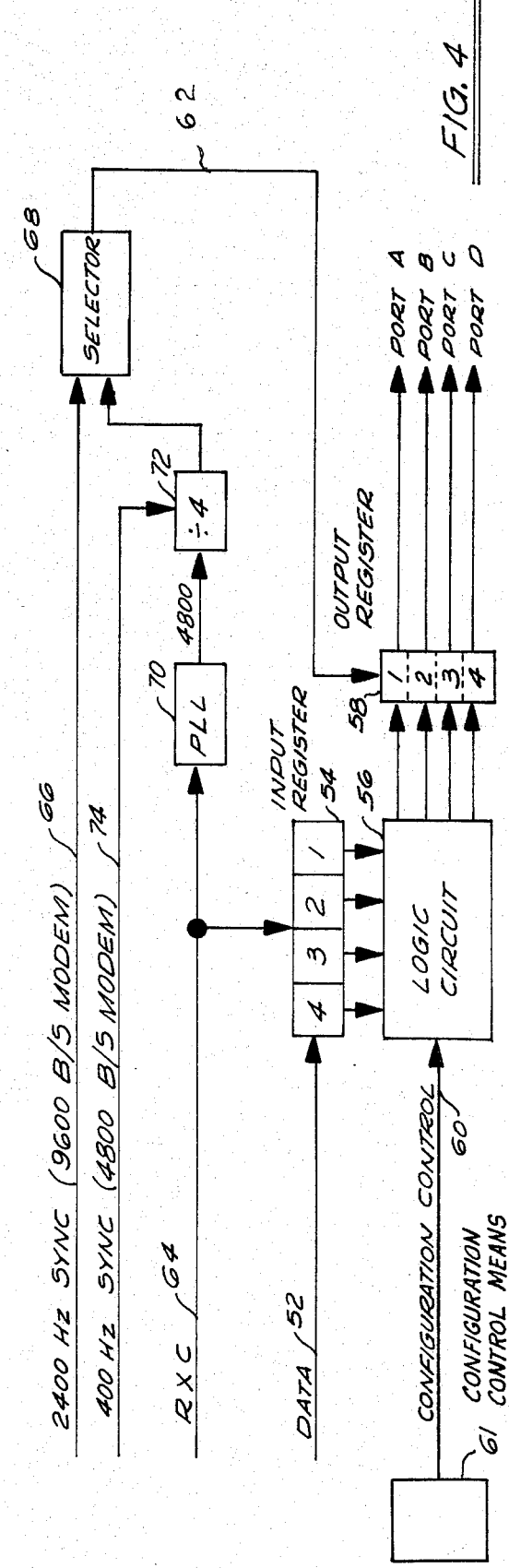
FIG. 4 shows a demultiplexer according to the present invention.

FIG. 4 shows a demultiplexer which could be used for either a 2400 baud or 1600 baud system, with all the combinations listed on tables 1 and 2. In this demultiplexer, demodulated data from modem 24 is received on line 52 and is serially fed into a 4 bit input register 54. From input register 54 the data is fed in parallel to a logic circuit 56. The purpose of this circuit is to distribute the four bits from the input register to the appropriate cells 1–4 of an output or buffer register 58, in accordance with a configuration control command received from line 60. Logic circuit 56 may be implemented by using elementary gates such as NAND, and NOR gates, or by using a logic gate matrix array such as a PROM 82S131 manufactured by Signetics Corporation, Sunnyvale, Calif.

The configuration control command tells the logic circuit 56 which particular system (2400 or 1600) and which particular combination (as defined in Tables 1 and 2) are being used. This command is derived from configuration control means 61 which may include manual switches disposed on the housing of the modem 24 (not shown) and/or by automatic means.

Output register 58, a four-bit parallel-in/parallel-out register, is used to transfer the respective bits from the logic circuit 56 to four ports A, B, C, D when a transfer command is received on enabling line 62. From ports A, B, C, D the bits are sent to corresponding remote equipment 28, 30, 32, 34 at the proper data rate.

The operation of the circuit of FIG. 4 is best described in conjunction with one of the particular combinations defined above. For example, if the system of FIG. 1 is operated at 9600 b/s in configuration No. 5 (i.e. bit stream 38 of FIG. 1), modem 24 demodulates the symbols received from modem 20 into a single series of data bits which are provided on line 52. The modem also provides a RECEIVE CLOCK (RXC) signal on line 64 which corresponds to the data rate. In this case the data rate is 9600 cps. This RXC signal is used to load the data bits from line 52 into input register 54. The input register is arranged so that the data bits propagate from the left-hand cell 4 towards the right-hand register 1 with each clock pulse. Thus if the data stream of the form ABCD ABCD . . . is received on line 52, cells 1, 2, 3, 4 of register 54 contain bits A, B, C, D respectively at the end of each four RXC signals. These bits are then transferred into respective cells 1, 2, 3, 4 of register 58.

The transfer into the cells occurs under the control of a signal on line 62. This enabling signal is derived from a 2400 Hz SYNC signal received from the modem on line 66. This SYNC signal is coupled to line 62 by a selector 68. Preferably this SYNC signal is delayed by a sufficient time period to allow the proper bits to be loaded into input register 54. For a 2400 baud system the SYNC signal may be synchronized to each received symbol. The circuit functions identically for all the combinations shown in Table 1.

For a 1600 baud system the situation is more complex. The data bits are still fed into register 54 at rate of 4800 cps as determined by the RXC signal. The RXC signal is also used by a phase-locked loop (PLL) 70 to generate a 4800 Hz signal. This signal is fed into a divide-by-four device 72 to generate a 1200 Hz signal. The 1200 Hz signal is needed as means of identifying the A bits. In other words, since the bits are fed into input register 54 at a rate of 4800 b/sec, the 1200 Hz signal will indicate when bits A, B, C and D have been loaded into cells 1, 2, 3 and 4 respectively so that they can be transferred to the appropriate cells of output register 58 by logic circuit 56. In order to insure that the 1200 Hz demultiplexer enabling signal is properly latched or synchronized properly with bit A a synchronizing signal is used from the modem on line 74. As shown in FIG. 3, bit stream 46 comprises four distinct groups of tri-bits. Each tri-bit corresponds, or more properly, originates from one of the signals of signal stream 44. The groups can have the following forms: ABC, BCD, CDA, or DAB. In order to demultiplex the received signals properly, a synchronizing signal is sent from the transmitter to the receiver which coincides with the symbol corresponding to one of the above-specified tri-bits, such as ABC. For example each signal X corresonding to a tri-bit ABC may be modulated with respect to the other signals Y of the signal stream 46. One method of modulating the signals is to change their radial amplitude slightly. This method of deriving a multiplex synchronizing signal is described in the commonly assigned copending applications Ser. No. 447,988, now U.S. Pat. No. 4,509,171, filed by Gordon Bremer on Dec. 8, 1982 and Ser. No. 558,610 filed by William L. Betts and Kenneth Martinez on Dec. 6, 1983. The receiver of modem 24 is adapted to differentiate between the X and the Y signals and derive a corresponding 400 Hz demultiplex sync signal on line 74. This signal is then used in the divide-by-four circuit 72 as a synchronizing signal for the signal on line 62. This process is illustrated in FIG. 4. The 400 Hz sync signal goes high for each X signal. A second (1200 Hz) sync signal is derived by dividing the output of the phase lock loop 70 (4800 Hz) by four. The phase lock loop 70 is included to insure that the input to the divider is at 4800 Hz since the RXC 64 signal may be at 2400 Hz rather than at 4800 Hz. However if this division is performed arbitrarily the 1200 Hz sync signal from the divide-by-four circuit 72 might coincide with any one of the bits A, B, C or D. But if the 1200 Hz sync signal is synchronized so that it coincides with the 400 Hz sync signal as shown on FIG. 3 then it is insured that the 1200 Hz sync signal corresponds to the A bit.

Just as in the 2400 baud operation described above the 1200 Hz demultiplexer sync signal on line 62 is used as an enabling signal to transfer the bits from input register 54 to output register 58. The actual transfer is performed by the logic circuit 56 as previously described. Thus the circuit of FIG. 4 is capable of demultiplexing a 2400 baud, 9600 b/sec signal or a 1600 baud, 4800 b/sec signal into two, three or four concurrent bit streams; and a 2400 baud 7200 b/sec signal into two or three concurrent bits streams; and a 2400 baud, 4800 b/sec signal or a 1200 baud, 2400 b/sec signal into two concurrent bit streams.

We claim:

1. In a digital communication system adapted to transmit multi-valued signals which are modulated to provide a demultiplex synchronizing signal, a demultiplexer comprising:

a first memory element for storing received data bits said signals having a preselected configuration;

a second memory element for transferring received data to several remote units in accordance with said demultiplex synchronizing signal;

configuration control means for generating a command signal indicative of said signal configuration; and a logic array without memory for transferring from said first memory element to a second memory element in response to said command signal.

2. The demultiplexer of claim 1 further comprising means for generating a second synchronizing signal for enabling said second memory unit, said second synchronizing signal being dependent on the rate of received signal and the demultiplex synchronizing signal.

3. The demultiplexer of claim 2 wherein said means for generating said second synchronizing signal comprises a phase-locked loop.

4. The demultiplexer of claim 1 wherein said first and second memory elements are shift registers.

5. The demultiplexer of claim 4 wherein said first memory element is a serial-in/parallel-out shift register.

6. The demultiplexer of claim 4 wherein said logic array comprises a logic matrix.

7. The demultiplexer of claim 4 wherein said logic array comprises discrete digital logic elements selected from a group consisting of NAND and NOR gates.

* * * * *